United States Patent
Brienza et al.

[11] Patent Number: 5,862,874
[45] Date of Patent: Jan. 26, 1999

[54] STEERING MECHANISM FOR SHORT WHEELBASED FOUR-WHEELED VEHICLES

[75] Inventors: David M. Brienza, Allison Park; Clifford E. Brubaker, Pittsburgh, both of Pa.

[73] Assignee: University of Pittsburgh, Pittsburgh, Pa.

[21] Appl. No.: 879,131

[22] Filed: Jun. 19, 1997

[51] Int. Cl.$^6$ .................................................. B62D 15/00
[52] U.S. Cl. ........................ 180/6.5; 180/6.48; 280/91.1; 280/99
[58] Field of Search ................................... 180/6.48, 6.5, 180/907; 280/91.1, 99

[56] References Cited

U.S. PATENT DOCUMENTS

| | | |
|---|---|---|
| 618,225 | 1/1899 | Gifford ........................................ 280/99 |
| 641,514 | 1/1900 | Hunt ........................................... 180/6.5 |
| 1,067,988 | 7/1913 | Knapp ......................................... 280/98 |
| 1,081,372 | 12/1913 | Drew ........................................... 280/99 |
| 3,577,054 | 5/1971 | Banks . |
| 3,666,034 | 5/1972 | Stuller et al. ............................ 180/6.48 |
| 3,794,132 | 2/1974 | Moon . |
| 3,807,520 | 4/1974 | Chisholm . |
| 3,882,949 | 5/1975 | Anderson . |
| 3,905,436 | 9/1975 | Karchak, Jr. et al. . |
| 3,912,032 | 10/1975 | Benz et al. . |
| 3,921,744 | 11/1975 | Benoit et al. . |
| 4,044,850 | 8/1977 | Winsor . |
| 4,078,627 | 3/1978 | Brown et al. . |
| 4,141,566 | 2/1979 | Benes et al. . |
| 4,274,503 | 6/1981 | Mackintosh . |
| 4,341,278 | 7/1982 | Meyer . |
| 4,364,580 | 12/1982 | Shapcott . |
| 4,386,672 | 6/1983 | Coker . |
| 4,455,046 | 6/1984 | Linderoth . |
| 4,471,972 | 9/1984 | Young . |
| 4,476,949 | 10/1984 | Patton . |
| 4,549,624 | 10/1985 | Doman . |
| 4,586,723 | 5/1986 | Nabinger . |
| 4,652,026 | 3/1987 | Byrge . |
| 4,735,431 | 4/1988 | Tait . |
| 4,773,494 | 9/1988 | Anderson . |
| 4,811,964 | 3/1989 | Horn . |
| 4,890,853 | 1/1990 | Olson . |
| 4,892,323 | 1/1990 | Oxford . |
| 4,898,256 | 2/1990 | Lehner . |
| 4,926,952 | 5/1990 | Farnam . |
| 4,966,362 | 10/1990 | Ramaekers . |
| 5,020,815 | 6/1991 | Harris et al. . |
| 5,028,064 | 7/1991 | Johnson . |
| 5,050,695 | 9/1991 | Kleinwolterink, Jr. . |
| 5,076,390 | 12/1991 | Haskins . |
| 5,135,063 | 8/1992 | Kropf . |
| 5,141,242 | 8/1992 | Henzel . |
| 5,180,181 | 1/1993 | Letechipia . |
| 5,197,750 | 3/1993 | DiGeorge . |
| 5,201,377 | 4/1993 | Wilson . |
| 5,259,635 | 11/1993 | Picker . |
| 5,270,624 | 12/1993 | Lautzenhiser . |
| 5,273,304 | 12/1993 | Berkheimer . |
| 5,275,248 | 1/1994 | Finch et al. . |
| 5,288,091 | 2/1994 | Deschamps ............................... 280/99 |
| 5,291,959 | 3/1994 | Malblanc . |
| 5,427,398 | 6/1995 | Weybrecht . |
| 5,445,233 | 8/1995 | Fernie et al. . |
| 5,501,480 | 3/1996 | Ordelman et al. . |
| 5,518,081 | 5/1996 | Thibodeau . |
| 5,727,644 | 3/1998 | Roberts et al. ............................ 280/99 |

*Primary Examiner*—Anne Marie Boehler
*Assistant Examiner*—Michael Cuff
*Attorney, Agent, or Firm*—Thorp, Reed & Armstrong

[57] ABSTRACT

A steering mechanism for a wheelchair which minimizes the turning radius of the wheelchair providing good maneuverability while also minimizing the misalignment of each of the wheels. The steering mechanism substantially comprises a flat plate defining cam follower slots, two sliding members defining slots, four linkages which follow the path of the cam followers and are connected to the wheels, and a single actuator.

10 Claims, 9 Drawing Sheets

STEERING MECHANISM FOR SHORT WHEELBASED FOUR-WHEELED VEHICLES

BACKGROUND OF THE INVENTION

1. Field of the Invention

The present invention relates to a steering mechanism for a four wheeled vehicle. More particularly, the present invention concerns a steering mechanism for a short wheelbased four-wheeled wheelchair having a flat plate member defining four cam follower slots, two sliding members defining slots, four linkages connected to the four wheels and following the path of the cam followers and a single actuator wherein the steering mechanism enables the wheelchair to maneuver in tight spaces and minimize wheel misalignment.

2. Description of the Related Art

Figure 1:
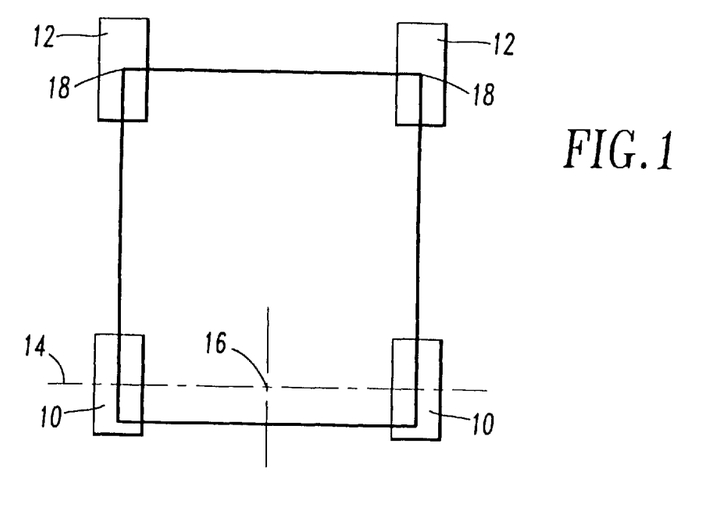
FIG. 1 is a schematic drawing of a conventional steering configuration for a wheelchair having fixed and driven rear wheels and front caster wheels.

The ability of a wheelchair user to maneuver in tight spaces is closely related to the drive and steering configuration of the wheelchair. The most common drive configuration is the differential rear wheel drive which is illustrated in FIG. 1 and consists of fixed and driven rear wheels 10 and front caster wheels 12. Direction changes are made by individually varying the speeds of the rear wheels 10. In this configuration the point about which the wheelchair rotates lies on a line 14 which is perpendicular to and extends through the center of the rear wheels 10. The minimum turning radius is achieved when the pivot point is directly between the rear wheels 10 which is point 16. The minimum turning radius corresponds to the minimum space required to turn the wheelchair, and is determined by the maximum distance from the pivot point to any other point on the wheelchair which is usually the front corners of the wheelchair at 18 or the user's feet hanging off the front of the wheelchair.

In order to minimize the turning radius for the rear wheel differential drive configuration, several conventional wheelchair manufacturers have moved the rear wheels forward closer to the geometric center of the wheelchair resulting in moving the pivot point of the wheelchair closer to the geometric center of the wheelchair and reducing the wheelchair turning radius. A disadvantage to this approach is that it includes casters and the more weight there is on the caster wheels, the more difficult it becomes to change directions when caster wheels must flip directions. Furthermore, this approach causes the designer to take extraordinary steps to provide stability. Typically, stability is achieved by counter balancing the user's mass over and in front of the main drive wheels with the mass of the batteries behind the main drive wheels. It may be necessary to provide caster or sprung wheels in the rear of the chair to avoid tipping backwards while accelerating forward. The addition of these extra wheels may also compromise the chair's ability to climb over low obstacles if the wheels are small.

Nowhere in the related art is there disclosed or suggested a steering mechanism for a wheelchair which enables the user to maneuver the wheelchair in tight spaces, while minimizing wheel misalignment and providing the ability to climb over low obstacles. Therefore, there is a definite need for a wheelchair incorporating the steering mechanism of the present invention which provides maneuverability in tight spaces which avoids the problems associated with caster wheels such as lack of stability and poor ability to climb over obstacles.

SUMMARY OF THE INVENTION

Accordingly, the present invention provides a steering mechanism for a wheelchair having maximum maneuverability, stability and the ability to climb over low obstacles.

The present invention further provides a wheelchair with the ability to steer all four wheels using a single steering actuator. Although it is preferred that the wheelchair be four-wheel steered, the present invention provides for two-wheel steering. Preferably, the steering mechanism of the present invention substantially comprises a flat plate member defining four cam follower slots, two members slidably connected to the flat plate member and also defining slots, four wheels, four linkages each of which are attached to and extend between one of the four wheels and the cam follower slots and the slots of the slidable members, and a single actuator for moving the linkages along the path of the cam follower slots such that the wheelchair has a small turning radius.

The present invention further provides for a steering mechanism having negligible misalignment between the wheels over the entire 180 range of each wheel which prevents undesirable scrubbing by the wheels when the wheelchair moves.

Other details, objects and advantages of the present preferred invention will become more apparent with the following description of the present preferred invention.

BRIEF DESCRIPTION OF THE DRAWINGS

The accompanying drawings describe the present preferred invention in which.

DETAILED DESCRIPTION OF THE DRAWINGS

Although the steering mechanism is suitable for other uses it will be described as being used in a wheelchair. Such description is for purposes of explanation and is not intended to limit the scope of this invention. For example, the steering mechanism of the present invention can be used to position pallets in a warehouse and to position platforms carrying robots.

Figure 2:
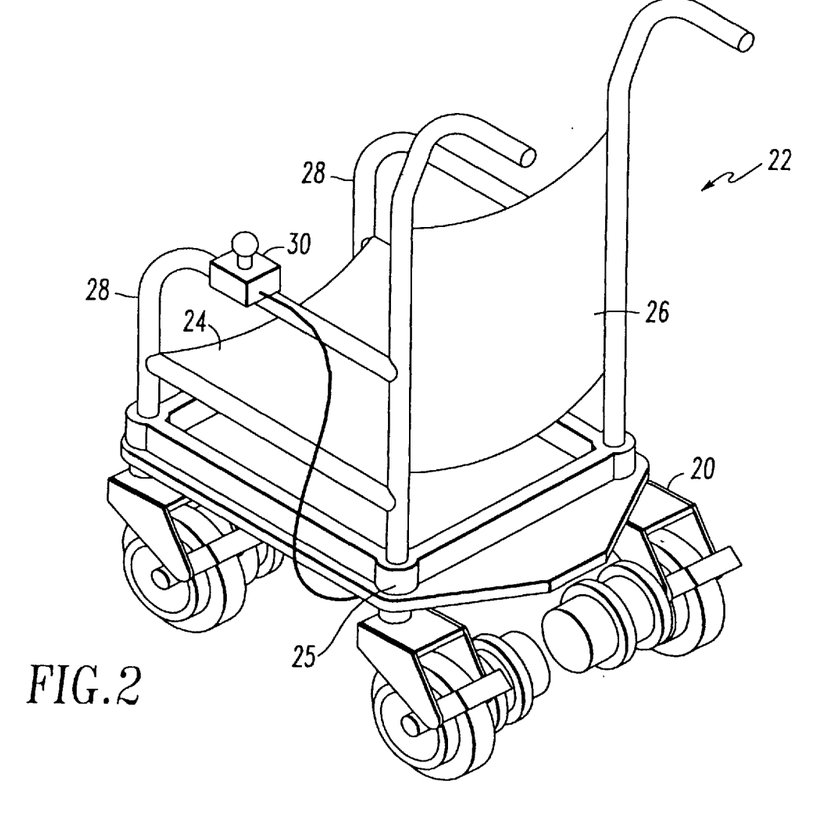
FIG. 2 is a perspective view of the preferred embodiment of a wheelchair according to the present invention.
Figure 3:
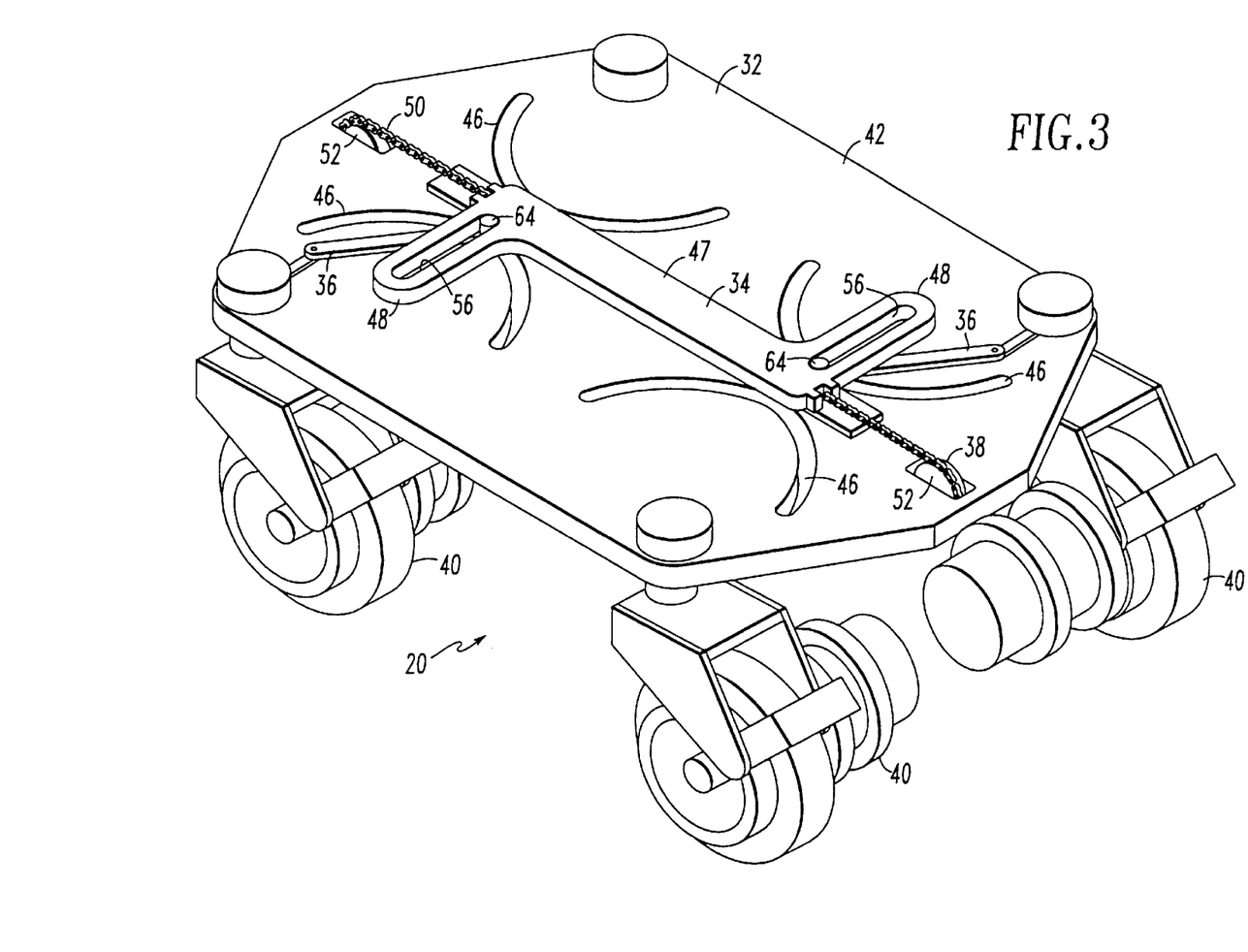
FIG. 3 is a perspective view of the steering mechanism employed in the wheelchair shown in FIG. 2.
Figure 4:
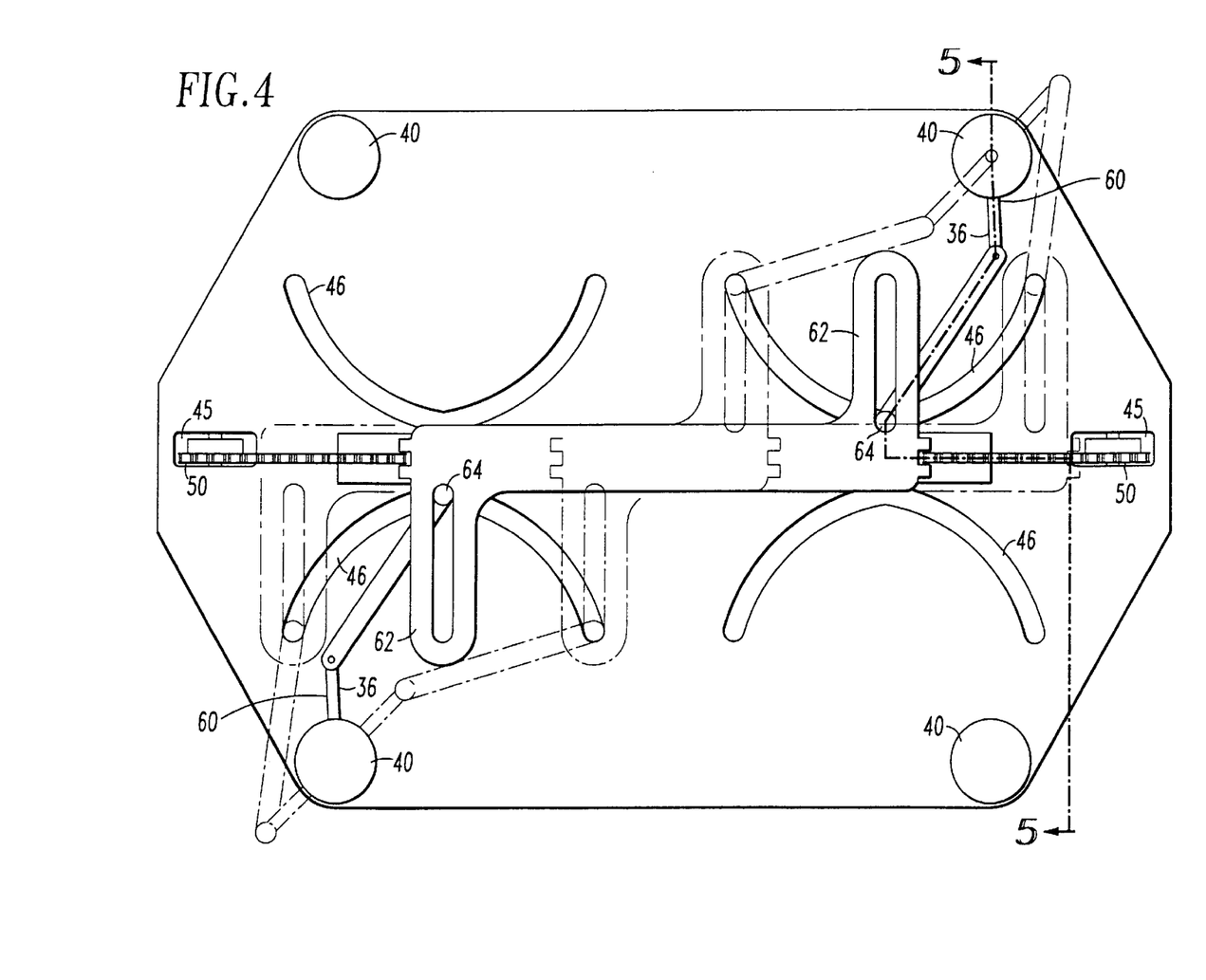
FIG. 4 is a top view of the steering mechanism shown in FIG. 2 wherein the sliding member are illustrated in hidden line in various positions.
Figure 5:
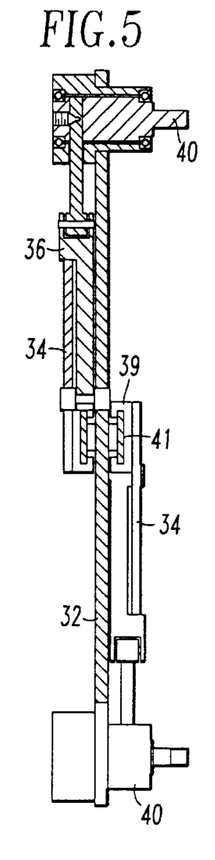
FIG. 5 is a horizontal cross-sectional view of the steering mechanism shown in FIG. 4 taken along line 5—5.
Figure 6:
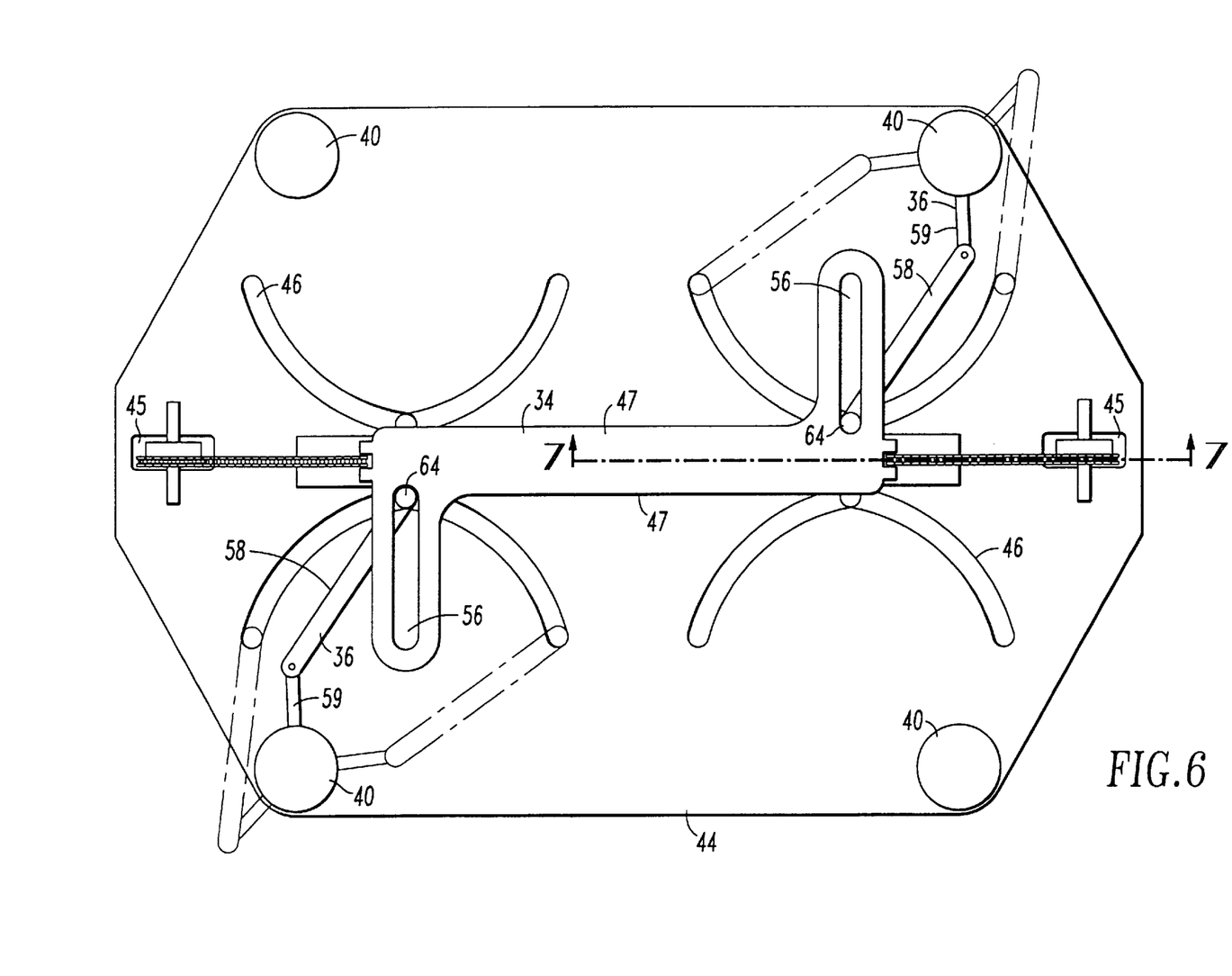
FIG. 6 is a bottom view of the steering mechanism shown in FIG. 3.

FIGS. 2 and 3 illustrate the steering mechanism 20 of the present invention being used in a wheelchair 22. The wheelchair 22 has a seat portion 24, a back portion 26 and armrests 28 wherein the seat portion 24 is attached to a frame 25 positioned on top of the steering mechanism 20. Although not illustrated, the wheelchair 22 can include many other features depending on the specific needs of the user. Furthermore, the wheelchair 22 is preferably motorized and is steered by the user with a joystick 30. However, it should be noted that the steering mechanism of the present invention can be employed in a wheelchair without a motorizd steering actuator such as a tiller or a mechanically linked steering wheel.

The steering mechanism 20, shown in greater detail in FIGS. 4–12, substantially comprises a flat plate member 32, two members 34 slideably attached to the flat plate member 32, four linkages 36, a single actuator 38 and four wheel assemblies 40 rigidly attached to the four linkages 36. The flat plate member 32 has a top surface 42 and a bottom surface 44 and defines four cam follower slots 46 each having an arcuate configuration. One of the four cam follower slots 46 are positioned in each of the quadrants of the flat plate member 32. The flat plate member 32 also has openings 45 spaced at two opposing ends. Although the flat plate member 32 is preferably octagonal it can be a variety of shapes.

One of the two sliding member 34 is positioned adjacent to the top surface 42 and the other of the sliding member 34 is positioned adjacent to the bottom surface 44. Each of the sliding members 34 have a elongated portion 47 and two arm portions 48. Each of the arm portions 48 are attached to one of the ends of the elongated portion 47 such that each of the arm portions 48 substantially forms a right angle with the elongated portion 47. The arm portions 48 define elongated slots 56 along the length of the arm portions 48. The sliding members 34 are slideably attached to the flat plate member 32 by a channel portion 39 of the sliding member 34 slideably engaging a T-shaped structure 41 attached to and extending from the flat plate member 32.

Figure 7:
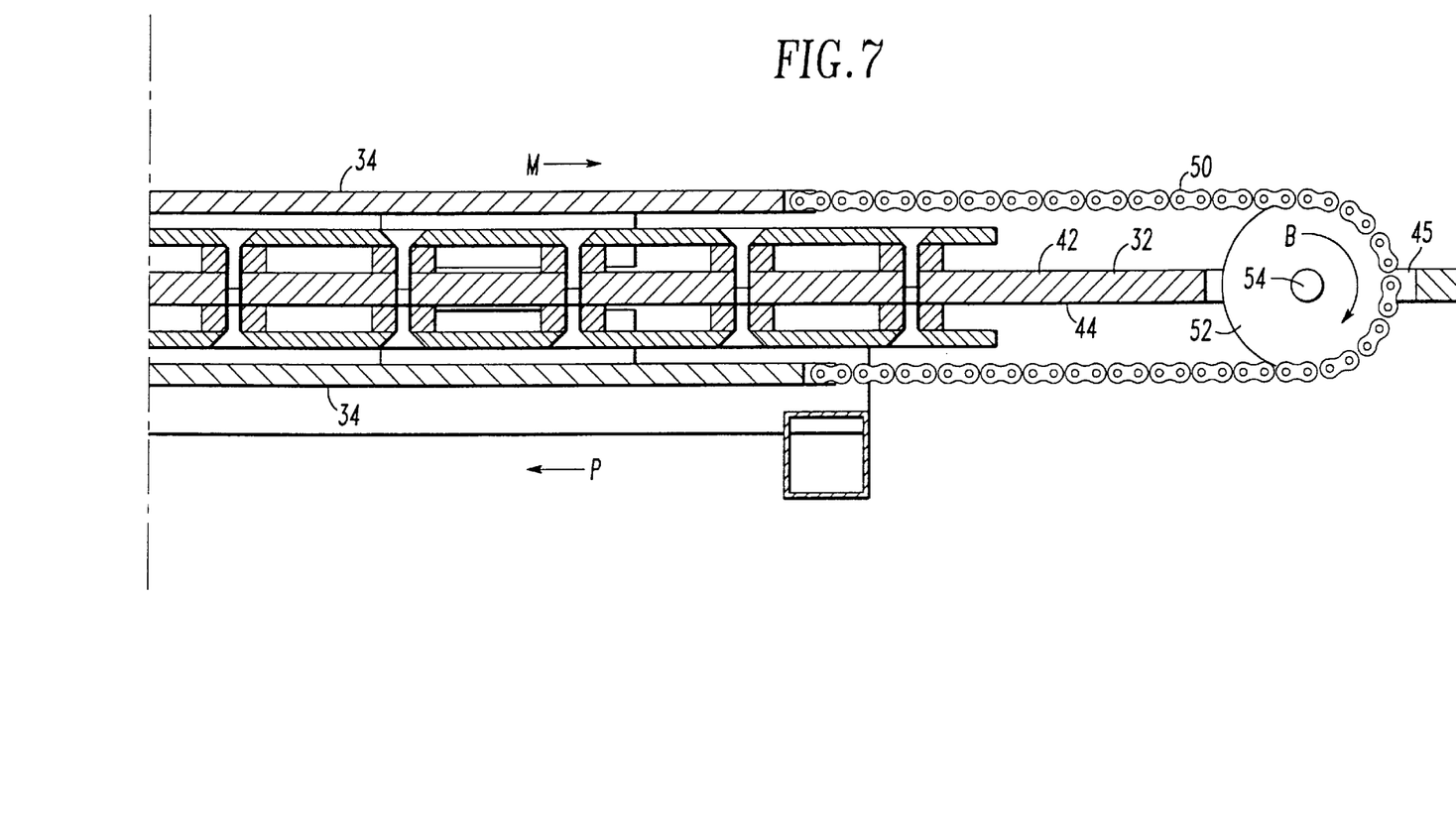
FIG. 7 is a partial longitudinal cross-sectional view of the steering mechanism of FIG. 6 taken along line 7—7.
Figure 8:
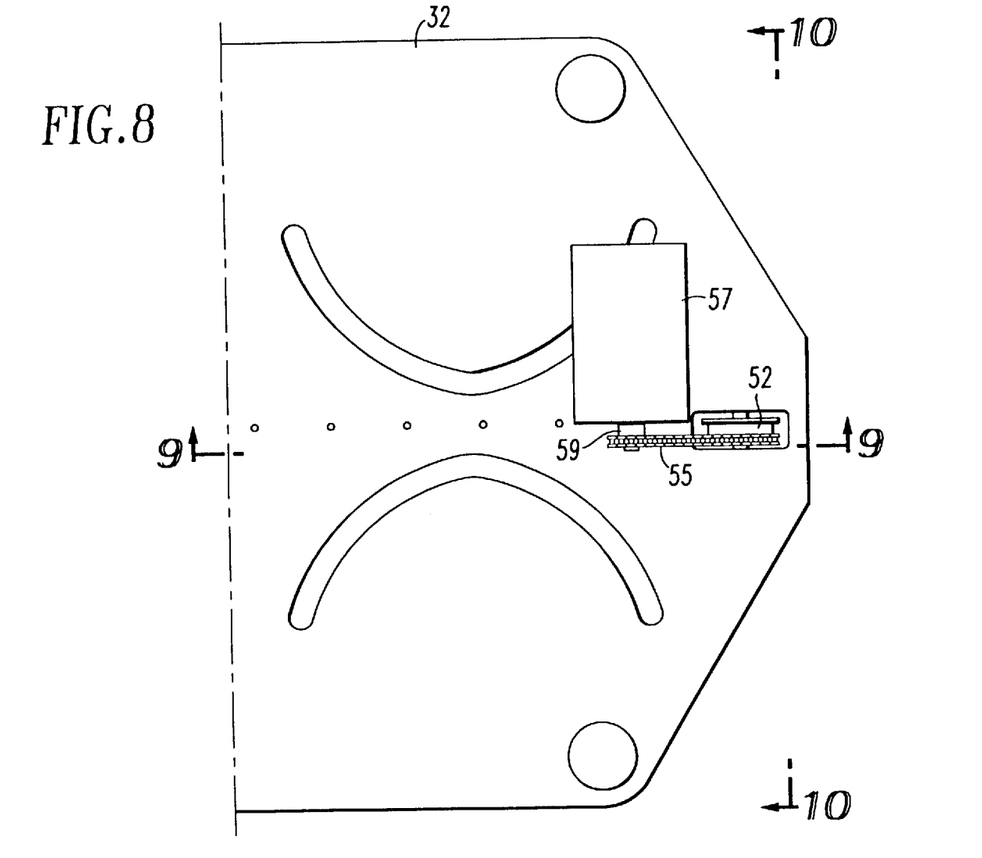
FIG. 8 is a partial top view of the plate member and the motor assembly of the steering mechanism shown in FIG. 4.
Figure 9:
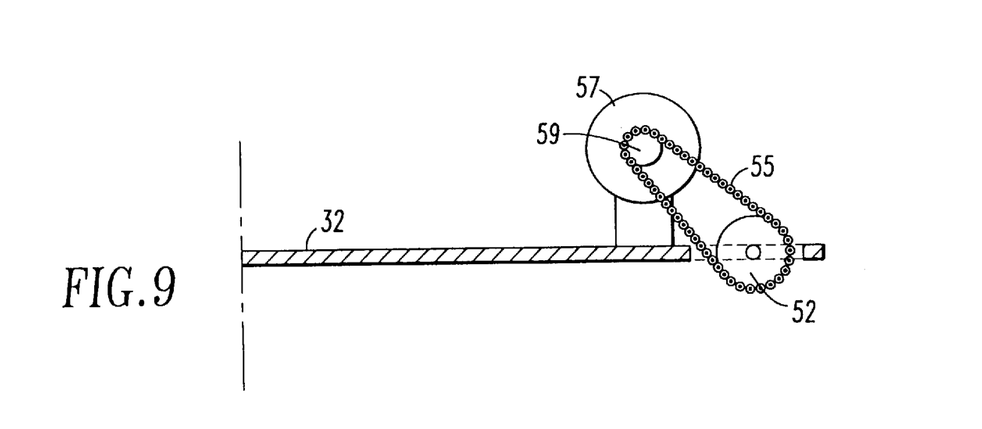
FIG. 9 is a longitudinal cross-sectional view of the steering mechanism shown in FIG. 8 taken along line 9—9.
Figure 10:
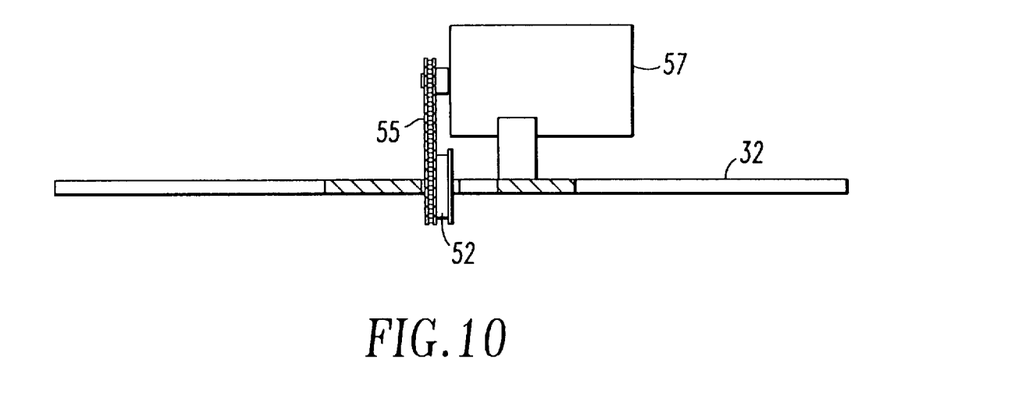
FIG. 10 is horizontal cross-sectional view of the steering mechanism shown in FIG. 8 taken along line 10—10.

The sliding members 34 are attached to one another by two chains 50. The chains 50 extend between and are fixedly attached to one end of each of the elongated portions 47 as shown in FIG. 7. Each of the chains 50 are positioned around a circular pulley member 52 that is rotatably connected to the flat plate member 32 by a shaft 54 and extends within one of the opening 45. One of the circular pulley members 52 is rotated by a circular chain 55 that is attached to a conventional motor 57, as shown in FIGS. 8–10. The chain 55 transfers the rotational movement of the shaft 59 of the motor 57 to the one of the circular pulley member 52. The rotation of the one of the circular pulley member 52 is then transformed into linear displacement of the sliding members 34. As shown in FIG. 7, the rotation of the one of the circular pulley member 52 in the direction of arrow B causes the chains 50 attached to the pulley member 52 to pull one of the sliding members 34 in the direction of arrow M and pull the other of the sliding members 34 in the direction of arrow P. Although not described, the single steering actuator can take the form of a rack and pinion device.

Each of the four linkages 36 have two links, an upper link 58 and a lower link 59 that are pivotably connected to one another to form the linkages 36 which has a first end 60 and a second end 62. The first ends 60 of each of the linkages 36 are rigidly connected to a wheel assembly 40 and are able to pivot about the wheel assembly 40. The second ends 62 of the linkages 36 have a rod 64 which is slidably received in both of one of the cam follower slots 42 and one of the sliding members slots 56. The rods 64 are substantially perpendicular to the linkages 36. Preferably, the length of the upper links 58 is six inches and the length of the lower links 59 is three inches. The lengths of the links 58,59 were chosen to maximize the transfer of power from the single steering actuator, including the chains 50, to the wheel assemblies 40. The lengths of the links 58,59 depend on the wheelbase and track length of the wheelchair. The dimensions of a typical wheelchair were used where the wheelbase is twenty inches (20 in.) and the track length is eighteen inches (18 in.).

Figure 11:
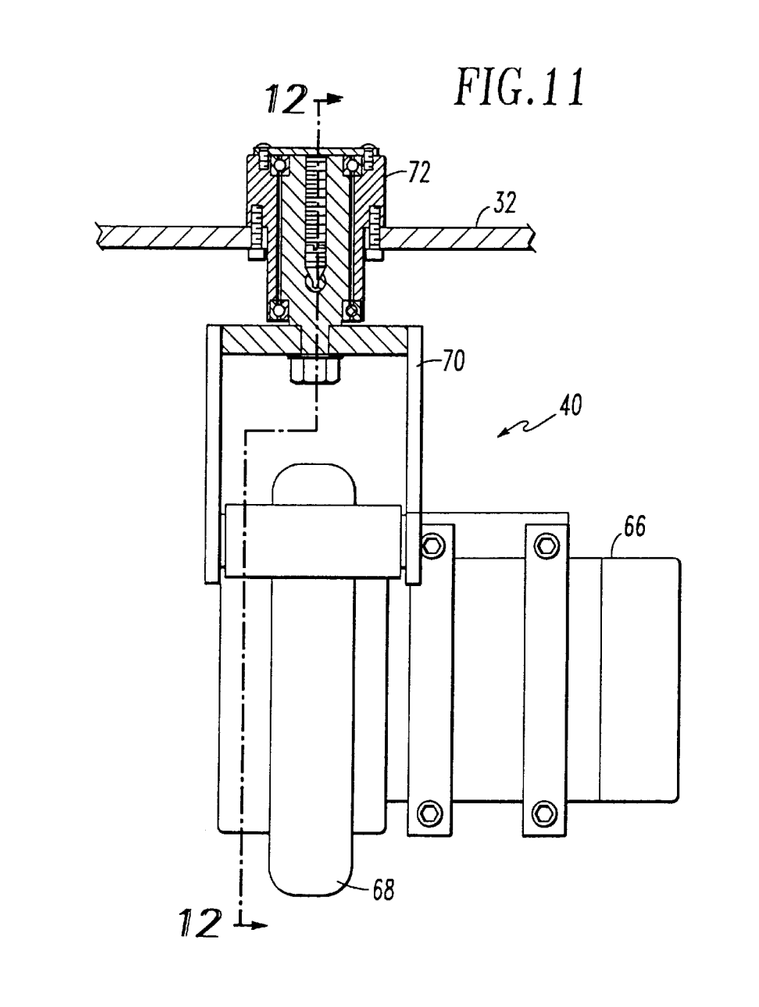
FIG. 11 is a plan view of the wheel assembly of the steering mechanism with the spindle of the wheel assembly and the plate illustrated in cross-section.
Figure 12:
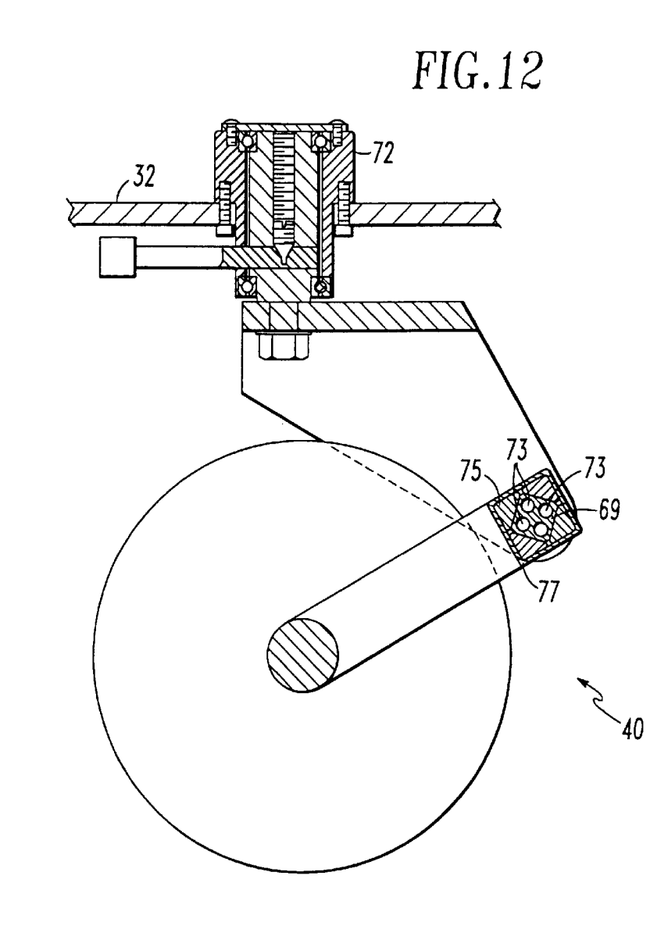
FIG. 12 is a side view of the wheel assembly shown in FIG. 11.

Referring to FIGS. 11 and 12, each of the four wheel assemblies 40 are preferably independently driven by a motor 66 attached to each of the wheel assemblies 40. Each of the wheel assemblies 40 include a wheel 68, a motor 66, a fork member 70, a suspension element 69 and a spindle connector 72 which connects the linkages 36 to each of the wheels 68. The spindle connector 72 is a bearing connector. The suspension element 69 is preferably a "ROSTA" suspension element, but other suspension elements can be used. The suspension element 69 extends across the fork member 70 and has rod members 73 rigidly attached to the fork member 70 and surrounded by rubber 75 which is encased in square tubing 77. Although not illustrated the wheel assemblies 40 can take many configurations and can include many features such as various suspension systems.

In operation, the user steers the wheelchair by manipulating the joystick 30. The joystick 30 transforms the command to turn left or right into a command to each of the wheel motors 66 and to the motor 57 which drives the steering actuator. The motor 57 turns the pulley member 52 such that the chains 50 pull the sliding members 34 in a direction that results in the rods 64 of the linkages 36 moving along the paths of the cam followers slots 42. The linkages 36 act as a crank to align the wheels 68 in the desired direction. Then each of the motors 66 of the wheels rotate the wheels 68 moving the wheelchair in the desired direction.

Figure 13:
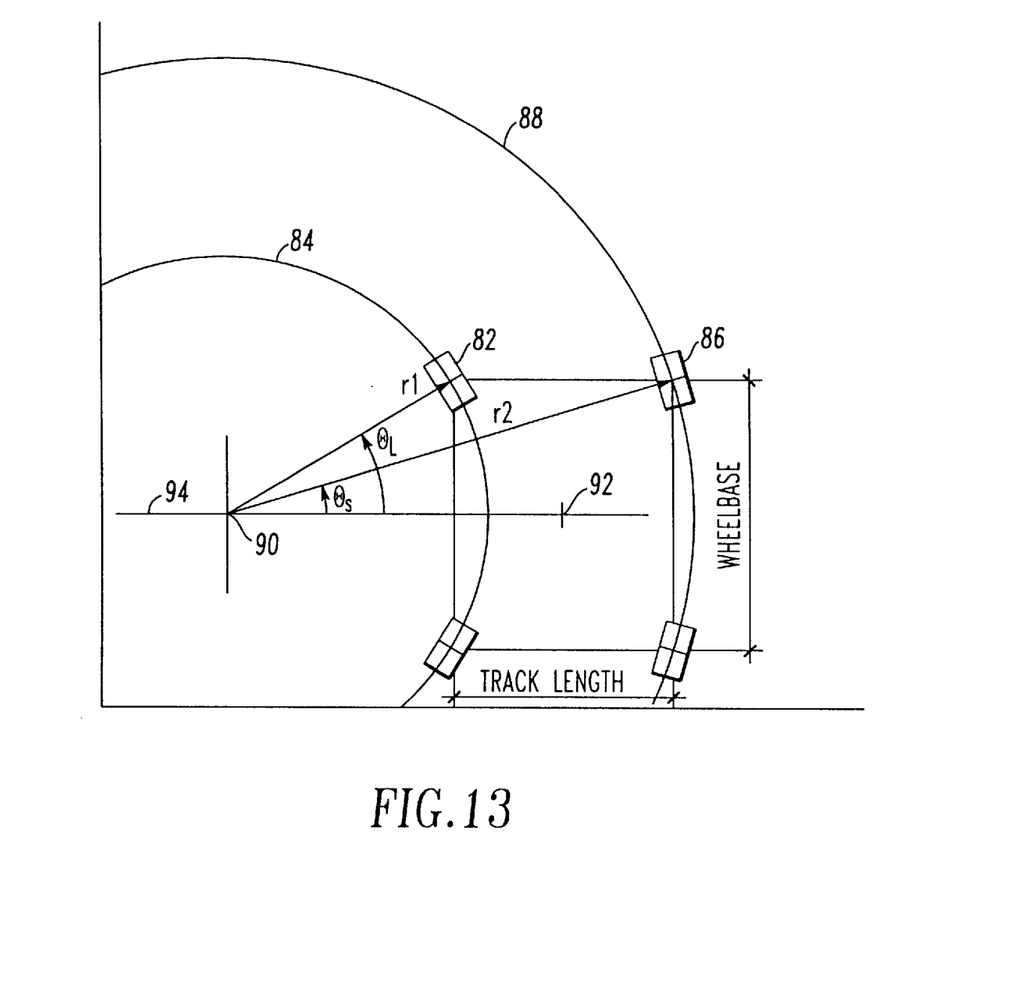
FIG. 13 is a schematic drawing which illustrates the alignment constraints for the four wheeled steered wheelchair of the present invention.
Figure 14:
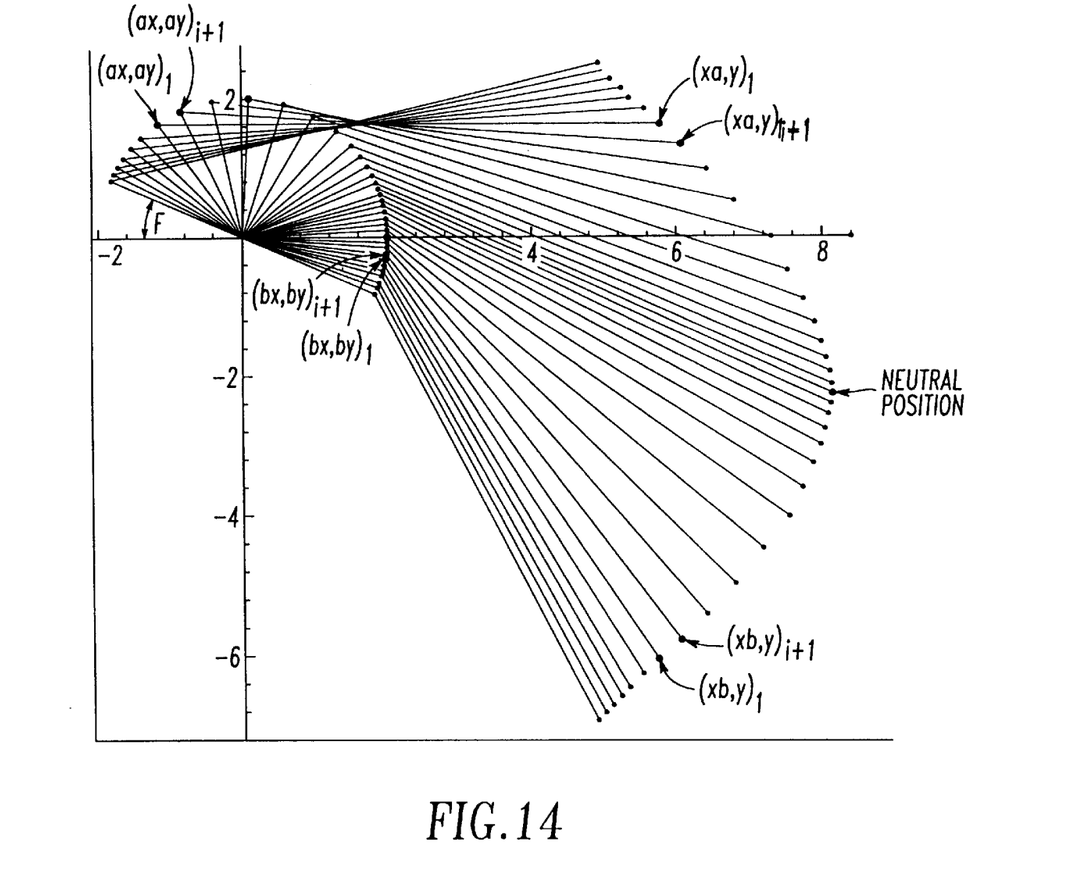
FIG. 14 is a graph which illustrates the movement of each of the four linkages of the present invention wherein the wheel assembly spindle is indicated in the origin.

As can be seen in FIG. 13, the steering mechanism 20 of the present invention enables the user to substantially rotate the wheelchair 22 about the center of the wheelchair 22, thus minimizing the turning radius of the wheelchair. In order to maintain proper alignment of the wheels to avoid undesireable scrubbing of the wheels, the steering angle on each wheel must be such that all four wheels are circumscribing concentric circles. In the case of the four wheel steered wheelchair of the present invention, the inside wheels 82 will travel along the path of the circle 84 with radius $r_1$ while the outside wheels 86 will travel along the circle 88 with a larger radius $r_2$. The turning radius of the wheelchair decreases as the center 90 of circles 84 and 88 move towards the center 92 of the wheelchair along its midline 94. The miniumum turning radius is achieved when the center 90 of circles 84 and 88 coincide with the center 92 of the wheelchair. For the wheelchair to have full turning range, the ability to rotate about its center in either direction, each wheel must be free to rotate through 180°. Proper alignment is maintained throughout the range if $$\theta_L = -\text{ArcTan2}(\text{Cot}(\theta_s - 2(\text{wheelbase/track length}))).$$

The steering linkage 36 provides proper alignment of the wheels through the shaping of the cam follower slot path.

Furthermore, the cam follower slot path is constrained to be symmetric about its midline so that there is a linear relationship between the translation along the path in the fore and aft direction and the turning motion of the inside and outside wheels of the wheelchair. Symmetry of the cam follower slot path allows for the use of a single, linear motion steering actuator to drive the steering motion of all four wheels.

The shape and location of the cam follower slot path is determined by the wheelbase and track length of the wheelchair and the specification of the lengths of the upper link 58 and the lower link 59. It is also necessary to specify the minimum angle between the two links 58 and 59. An angle range of ninety minus fifty-five degrees to ninety plus fifty-five degrees was choosen. However, if the lengths of the wheelbase and track were changed another angle range may be more appropriate. A point on the cam follower slot path, (x, y) is determined by solving the equation $$x_{midpoint} = x_a - \frac{x_a - x_b}{2}$$

for y in terms of $a_x$, $a_y$, $b_x$, $b_y$, and $x_{midpoint}$
where $$x_a = a_x - r^2 - (y - a_y)^2$$

$$x_b = b_x - r^2 - (y - b_y)^2$$

r is the length of the link between the cam and crank arm, i.e., the upper link.

$x_{midpoint}$ is determined by the specification of the constraint on the angle between the links at the extreme positions.

($a_x$, $a_y$) and ($b_x$, $b_y$) are coordinates of the points on the circular path of the joints of the lower link 59 and the upper link 58.

$x_a$ is the x coordinate of the point on the cam path corresponding to the location of the end of the linkage ($a_x$, $a_y$).

$x_b$ is the coordinate of the point on cam path corresponding to the location of the end of the linkage, ($b_x$, $b_y$).

y is the y coordinate of the point on the cam follower slot path.

To generate a cam follower slot path given the wheelbase, B, the track length, L, the crank arm length(i.e., the lower link), $r_c$, and the crank arm to cam link length (i.e., the upper link), r, a series of points ($a_x$, $a_y$) and ($b_x$, $b_y$) were generated on the circular path described by the path of the linkage where $$a_x = r_c \sin(\theta_s + \phi)$$

$$a_y = r_c \cos(\theta_s + \phi)$$

$$b_x = r_c \sin(\theta_L + \phi)$$

$$b_y = r_c \cos(\theta_L + \phi)$$

and $$\theta_L = -\text{ArcTan2}(\text{Cot}(\theta_s - 2^B/L))$$

φ is the angular offset of the crank arm when the wheels are pointed in the neutral position.

The phase angle, φ, is set to position the cam follower slot path relative to the spindle connector such that the y coordinate of the end points of the path are the same. This allows for the coordination of all four wheels from a single linear actuator. The path is positioned by setting the angle φ, such that $$\phi = \text{ArcTan} \frac{y_2\left(\frac{\pi}{2} - \text{ArcTan}\left(\frac{B}{L}\right), -\theta_{max}\right) - y_2\left(\frac{\pi}{2} + \text{ArcTan}\left(\frac{B}{L}\right), \theta_{max}\right)}{x_2\left(\frac{\pi}{2} - \text{ArcTan}\left(\frac{B}{L}\right), -\theta_{max}\right) - x_2\left(\frac{\pi}{2} + \text{ArcTan}\left(\frac{B}{L}\right), \theta_{max}\right)}$$

where $$x_2(\theta_1, \theta_2) = r_c \sin(\theta_1) + r \sin(\theta_1 + \theta_2 + \pi/2)$$

$$y_2(\theta_1, \theta_2) = r_c \cos(\theta_1) + r \cos(\theta_1 + \theta_2 + \pi/2)$$

$\theta_{max}$ is the constraint set on the deviation of the angle between the links from 90°.

The solution for y above is used to compute the points on the cam follower slot path, $(x_a, y)_i$, corresponding to the points $(a_x, a_y)$ and corresponding to the points $(x_b, y)_i$ and corresponding to the points $(b_x, b_y)$.

Although not illustrated the steering mechanism 20 of the present invention can be adapted to be used with a wheelchair having only the two wheels being driven. In this embodiment, either the front wheels or the rear wheels would be fixed and two of the cam follower slots would be eliminated from the flat plate member 32. Furthermore, the remaining two cam follower slots would take a different shape. The paths of the remaining two cam follower slots would be determined by the procedure above while substituting 2B for B. In this embodiment, the center of rotation of the wheelchair would be on a point of a line which passed through the fixed wheel pair.

While the present invention has been described herein, it is distinctly understood that the invention is not limited thereto but may be otherwise variously embodied in the scope of the following claims and any equivalent thereof.

We claim:

1. A device for rotating a body about the center of the body comprising:

(a) a plate member defining a plurality of cam follower slots;

(b) a plurality of members slidably connected to the plate member and defining a plurality of second slots equal to the number of the plurality of cam follower slots;

(c) a plurality of wheels rotatably attached to the plate member;

(d) a plurality of linkages each having a first end and a second end, the first ends of the plurality of linkages are attached to the plurality of wheels and pivot about the plurality of wheels, the second ends of the plurality of linkages each have a rod which is slidably received within the plurality of cam follower slots and the plurality of second slots; and (e) a single actuator for moving the plurality of sliding members such that the rods slide along the path of the cam follower slots and the plurality of linkages pivot about the plurality of wheels resulting in the body moving about its center.

2. A steering mechanism for a wheelchair, comprising:
  (a) a plate member defining four cam follower slots and having a top surface and a bottom surface;
  (b) two members slidably connected to the plate member and each member defining two slots, one of the two members being positioned adjacent to the top surface and the other of the two members positioned adjacent to the bottom surface;
  (c) four wheels;
  (d) four linkages each having two links pivotably attached to one another, each of the four linkages having a first end and a second end, each of the first ends of the four linkages being rigidly attached to one of the four wheels and able to pivot about the wheels, each of the second ends of the four linkages having a rod which is slidably received by the one of the four cam follower slots and one of the slots of the slidable members; and
  (e) a single actuator for simultaneously moving the two sliding members opposite of one another such that the sliding members direct the rods along the four cam follower slots so that the wheels are turned such that the wheelchair rotates substantially about its center.

3. The steering mechanism according to claim 2 wherein the two sliding members have a channel member which is slideably engaged to a T-shaped member of the flat plate member.

4. The steering mechanism of claim 2 wherein the path of each of the four cam follower slots are substantially arcuate.

5. The steering mechanism of claim 2 wherein the two slidable members have an elongated portion with two ends and an arm portion which extends from both the ends and substantially forms a right angle with the elongated portion, and wherein the slots of the slidable members are formed within the arm portions.

6. The steering mechanism of claim 2 wherein the single actuator is two chain members attached to the to slidable members.

7. The steering mechanism of claim 2 wherein the single actuator is motorized.

8. The steering mechanism of claim 2 wherein the single actuator is manually directed.

9. The steering mechanism of claim 2 wherein each of the wheels are driven independently with a motor.

10. A wheelchair comprising:
  (a) a chair member having a seat portion and a back portion;
  (b) a frame wherein the chair member is positioned on the frame;
  (c) four wheels;
  (d) a motor attached to at least two of the four wheels such that the motor turns at least two of the four wheels;
  (e) a plate member defining four cam follower slots and having a top surface and a bottom surface;
  (f) two members slidably connected to the plate member and each member defining two slots, one of the two members being positioned adjacent to the top surface and the other of the two members positioned adjacent to the bottom surface;
  (g) four linkages each having two links pivotably attached to one another, each of the four linkages having a first end and a second end, each of the first ends of the four linkages being rigidly attached to one of the four wheels and able to pivot about the wheels, each of the second ends of the four linkages having a rod which is slidably received by the one of the four cam follower slots and one of the slots of the slidable members; and
  (h) a single actuator for simultaneously moving the two sliding members opposite of one another such that the sliding members direct the rods along the four cam follower slots so that the wheels are turned such that the wheelchair rotates substantially about its center.

* * * * *